May 17, 1949. J. R. WEST ET AL 2,470,278
BALING PRESS
Filed Dec. 6, 1946
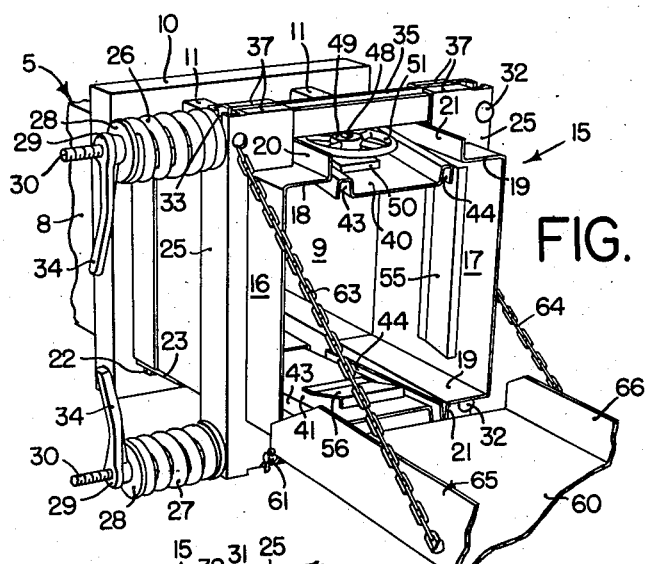
INVENTORS
JAMES R. WEST, GEORGE B. HILL &
MARCUS E. McCLELLAN
BY
ATTORNEYS Patented May 17, 1949

2,470,278

UNITED STATES PATENT OFFICE 2,470,278

BALING PRESS

James Rex West, George B. Hill, and Marcus E. McClellan, Ottumwa, Iowa, assignors to Deere Manufacturing Co., a corporation of Iowa Application December 6, 1946, Serial No. 714,360

7 Claims. (Cl. 100—23)

The present invention relates generally to baling presses and more particularly to the compression mechanism at the discharge end of the bale case of a baling press, and is in the nature of an improvement over the mechanism disclosed in the co-pending application, Serial No. 614,395, filed September 4, 1945, by George B. Hill, one of the co-inventors of the present invention. This application was issued on January 11, 1949, as Patent Number 2,458,994.

Certain crops, such as, for example, prairie hay, are so slippery that, when formed into bales, do not offer sufficient frictional resistance to the baling wire or twine to retain the latter in place around the bales, with the result that the wires or twine strands have a tendency to slip laterally off the bales and thus lose the contents thereof. It is, therefore, one of the principal objects of the present invention to provide means for overcoming this difficulty.

In the accomplishment of this object, we have found that by compressing the central portion of each bale to a greater extent than the corners thereof, this tendency is, to a considerable extent, overcome, due to the fact that the longitudinal periphery of the bales near the sides thereof is greater than that near the center, thereby causing the wires to become tighter on the bales as they slip laterally thereon.

During the time that the bale is moving outwardly through the bale case after the wires have been tied, the wires are comparatively loose around the bales, for the bales are held in tightly compressed condition by the walls of the bale case. Some difficulty has been encountered because of the loose wires slipping out of place while the bales are still in the compression portion of the bale case, and therefore it is another object of the present invention to provide guide means for holding the wires in proper positions on the bales until the latter are discharged from the bale case, after which the bales expand sufficiently to tighten the wires and hold them against slipping. This object is accomplished by providing guide channels on the compression walls which act against the central portions of the bale, through which channels the wires travel as the bale slides out through the discharge end of the case.

These and other objects and advantages of our invention will be apparent to those skilled in the art after a consideration of the following description, in which reference is had to the drawings appended hereto, in which Figure 1 is a perspective view of the compression portion of a bale case embodying the principles of the present invention;

Figure 2 is a top plan view of the discharge end of the bale case including the compression portion;

Figure 3 is a sectional elevational view taken along the line 3—3 in Figure 2; and Figure 4 is an end elevational view of the compression portion of the bale case, taken substantially along the line 4—4 in Figure 2, and drawn to a slightly smaller scale.

Referring now to the drawings, the main portion of the bale case is indicated by reference numeral 5 and comprises a pair of vertically spaced top and bottom walls 6, 7 and a pair of laterally spaced side walls 8, 9, the four walls defining a tubular bale case of rectangular cross section. A peripheral box frame 10 encircles the bale case 5 near the end thereof, to reenforce the case to prevent spreading of the walls thereof. Both the top and bottom walls 6, 7 are formed with a pair of laterally spaced longitudinally extending channels 11, 12, which open inwardly of the case and through which the baling wires travel as the bales move toward the discharge end of the case, after they have been tied.

The outer end of the bale case 5 is provided with a compression portion, indicated in its entirety by reference numeral 15, and comprises a pair of laterally spaced vertical side walls 16, 17, which are disposed substantially in the plane of the side walls 8 and 9 of the main bale case 5, respectively, and serve as extensions thereof. The side walls 16 and 17 have horizontal flanges 18, 19 turned inwardly toward each other along the top and bottom edges of the two side walls and substantially in the planes of the top and bottom walls 6, 7, respectively. A pair of vertical flanges 20 are turned upwardly and downwardly, respectively, from the inner edges of the horizontal flanges 18 of the wall portion 16, and another pair of vertical flanges 21 are similarly provided at the inner edges of the flanges 19 on the wall 17. Each of the side walls 16 and 17 is pivotally connected to the end of the bale case 5 by means of pivot bolts 22 disposed on vertical axes through upper and lower hinge plates 23, fixedly secured, as by welding, to the horizontal flange portions 18, 19.

Each of the side walls 16, 17 is provided with a structural brace 25, of box construction extending vertically along the outer side of the associated wall and inwardly along the outer side of the associated horizontal flanges 18, 19. These braces 25 hold the side walls 16, 17 against outward bowing, and also brace the horizontal flanges to hold them substantially perpendicular to the vertical walls.

The vertical walls 16, 17 are urged toward each other by means of heavy helical compression springs 26, 27, which bear against the vertical brace 25 on one of the walls 16 and act through a washer 28 against a nut 29 engaging a threaded tension rod 30. The two tension rods 30 extend coaxially through the springs 26, 27, respectively, and lie horizontally above and below the compression portion 15 and pass through suitable apertures in the brace 25 against which the springs 26, 27 bear. The opposite ends of the tension rods 30 are provided with eyes 31, which are secured by bolts 32 to the vertical brace member 25 on the opposite wall 17. The nuts 29 are provided with handles 34, by means of which the nuts can be adjusted axially of the threaded rods 30 to adjust the amount of compression force in the springs 26, 27, and thus adjusting the amount of force applied to urge the two walls 16, 17 toward each other.

The two bracing members 25 are interconnected above and below the compression portion 15 of the bale case 5 by channel members 35, 36, which have their open ends facing outwardly and through which the tension rods 30 extend. The channel members 35, 36 each have their two ends inserted into the associated end of the bracing members 25, the latter having retaining ears 37 in the form of flanges which are turned over the flanges of the channels 35, 36. The channels are thus slidable relative to the braces 25 to accommodate lateral movement of the walls 16, 17.

The compression device 15 also includes a pair of top and bottom walls 40, 41 disposed generally horizontally and spaced apart vertically. Each of the top and bottom walls extends between the inner edges of the flanges 18, 19 of the side walls, and is provided along opposite edges, respectively, with longitudinally extending channels 43, 44 formed integrally therewith, with the channels opening inwardly of the bale case extension 15 and tapering outwardly so that the laterally opposite sides of the walls 40, 41 converge outwardly to allow a limited amount of inward movement of the side walls 16, 17 under pressure of the springs 26, 27. The top and bottom walls 40, 41 are pivotally connected to the end of the main bale case 5 by means of transversely aligned pivot bolts 45, 46, which are supported in the inner side walls of the groove portions 11, 12 in the top and bottom walls 6, 7, respectively. A pair of hinge plates 47 are pivoted to the bolts 45, 46 and are fixed, as by welding, to the inner sides of the grooves 43, 44 in the upper and lower walls 40, 41, thus providing for vertical swinging movement of the latter about transverse axes.

Each of the walls 40, 41 is adjustable vertically to increase or decrease the pressure thereof against the central portions of the bale passing therethrough, by means of vertical threaded studs 48 rigidly fixed to the central web portions of the upper and lower channel members 35, 36, respectively. Each of the threaded studs 48 carries a threaded hub 49, which bears against a wear plate 50 welded to the outer surface of the associated top or bottom wall 40, 41. A hand wheel 51 is fixed to each of the hubs 49 to provide for adjustment of the latter along the corresponding stud 48. Thus, by rotating the hand wheel 51 the associated top or bottom plate 40, 41 can be adjusted toward or away from the bale within the bale case extension 15.

During operation, the bales after being tied are forced toward the discharge end of the bale case by the baling plunger (not shown) which presses the crop material into the bale being formed, the amount of pressure exerted by the plunger against the bale being determined by the amount of resistance imposed by the compression device 15 to the outward movement of the bales as they are discharged from the bale case. This resistance is increased to some extent by the addition of pressure plates 55 extending vertically on the inner sides of the vertical walls 16, 17, respectively, the plates 55 being inclined relative to the side walls so that they converge outwardly toward the discharge end of the bale case. The top and bottom walls 40, 41 are also provided with outwardly converging pressure plates 56, which act with the converging plates 55 to constrict the discharge opening and thus provide resistance to outward movement of the bales.

As best illustrated in Figure 4, the top and bottom walls 40, 41 are adjusted inwardly toward each other when baling prairie hay and other slippery crops. This is accomplished by turning the hand wheels 51 to adjust the hubs 49 toward each other, thereby swinging the walls 40, 41 to an outwardly converging relation in which the outer ends of the walls 40, 41 are appreciably closer together than the vertical distance between the upper and lower flanges 18 and 19. A bale is indicated at 58 in Figure 4, which illustrates how the central portion of the bale is compressed to a greater extent than the outer side portions between the flanges 18 and 19. The channels 43, 44 are disposed in longitudinal alignment with the channels 11 in the main bale case 5, and thus act as guides for bale wires or twine strands 59, which lie within the channels 43, 44 and are prevented from sliding outwardly on the bales. Without the channels 43, 44 on the vertically movable top and bottom walls 40, 41 the wires tend to slide under the flanges 18, 19 and even loop over the tops of the vertical flanges 20, 21 and thereby sometimes interfering with the movement of the bales through the bale case.

The bales are discharged upon a table or tail board 60, which is pivotally connected by a transverse hinge 61 to a pair of brackets 62 secured in laterally spaced relation to the bottom wall 41. A pair of suspension chains 63, 64 are connected between the vertical braces 25 and a pair of upwardly extending flanges 65, 66, respectively, on opposite sides of the table 60.

We claim:

1. In a baling press, a bale case having a compression portion at one end comprising a pair of opposed channel shaped walls having flanges turned inwardly toward each other, a second pair of opposed walls disposed between said flanges and adjustable toward and away from each other, and a pair of longitudinally extending channel portions on the edges of said second pair of walls, said channel portions being open inwardly to receive binding wires or twine on bales passing therethrough, to prevent said wires or twine from slipping off the bales.

2. In a baling press, a bale case of generally rectangular cross section having a compression portion at one end thereof comprising a plurality of walls serving as extensions to the walls of the bale case and including two pairs of opposed walls, the walls of each pair being adjustable toward and away from each other, one pair of said walls having flanges along longitudinal edges thereof turned inwardly to confine the four longitudinal corners of bales passing therethrough, the other pair of walls being disposed between the edges of the opposing flanges of said one pair of walls, respectively, and provided with guide channels opening inwardly along longitudinal edges for receiving binding wires or twine on said bales.

3. In a baling press, a bale case of generally rectangular cross section having a compression portion at one end thereof comprising a plurality of walls serving as extensions to the walls of the bale case and including two pairs of opposed walls, the walls of each pair being adjustable toward and away from each other, one pair of said walls having flanges along longitudinal edges thereof turned inwardly to confine the four longitudinal corners of bales passing therethrough, the other pair of walls being disposed between the edges of the opposing flanges of said one pair of walls, respectively, and normally adjusted inwardly of the planes of said flanges to compress the center of the bales more than the corners thereof, said other pair of walls being provided with guide channels opening inwardly along their longitudinal edges for receiving binding wires or twine on said bales.

4. In a baling press, a bale case having a compression portion at one end thereof comprising a plurality of walls serving as extensions to the walls of the bale case and pivotally connected thereto, respectively, on axes disposed transversely of the bale case and including two pairs of opposed walls, a pair of connecting members extending between one pair of opposed walls outside the other pair of walls for restraining said one pair in bale compressing position, and adjusting means acting against said other pair of walls and reacting against said connecting members, respectively, for adjusting said other pair of walls inwardly toward each other.

5. In a baling press, a bale case having a compression portion at one end thereof comprising a plurality of walls serving as extensions to the walls of the bale case and pivotally connected thereto, respectively, on axes disposed transversely of the bale case and including two pairs of opposed walls, a pair of connecting members extending between one pair of opposed walls outside the other pair of walls for restraining said one pair in bale compressing position, and adjusting means acting against said other pair of walls and reacting against said connecting members, respectively, for adjusting said other pair of walls inwardly toward each other, each of said adjusting means comprising a pair of extensible threaded elements and means for rotating one of said pair of elements.

6. In a baling press, a bale case having a compression portion at one end thereof comprising a plurality of walls serving as extensions to the walls of the bale case and pivotally connected thereto, respectively, on axes disposed transversely of the bale case and including two pairs of opposed walls, one pair of said walls having flanges along longitudinal edges thereof turned inwardly to confine the four longitudinal corners of a bale passing therethrough, the other pair of walls being disposed between the edges of the opposing flanges of said one pair of walls, respectively, a pair of connecting members extending between said one pair of opposed walls outside the other pair of walls, adjusting means acting between said connecting members and said other pair of walls, respectively, for adjusting the last mentioned walls toward each other inwardly of the planes of said opposing flanges to compress the center portions of the bales, and pairs of inwardly opening guide channels extending along opposite longitudinal edges, respectively, of said other walls for receiving baling wires or twine on the bales and preventing said wires or twine from slipping laterally thereon.

7. The combination set forth in claim 1, including the further provision that the channel portions taper outwardly to provide for inward movement of said first pair of walls to an outwardly converging position.

JAMES REX WEST.
GEORGE B. HILL.
MARCUS E. McCLELLAN.

REFERENCES CITED

The following references are of record in the file of this patent:

UNITED STATES PATENTS

| Number | Name | Date |
| --- | --- | --- |
| 335,290 | La Dow | Feb. 2, 1886 |
| 434,775 | Gehrt | Aug. 19, 1890 |